United States Patent
Lin et al.

(10) Patent No.: US 7,951,493 B2
(45) Date of Patent: May 31, 2011

(54) METHODS FOR EXTENDING THE SHELF-LIFE OF FOOD COMPOSITIONS CONTAINING POLYUNSATURATED FATTY ACIDS

(75) Inventors: Hungwei Charlie Lin, Lawrence, KS (US); Harry Mead Clark, III, Topeka, KS (US); Brent Karl Pope, Topeka, KS (US); Jerry Don Millican, Topeka, KS (US); Viswas Ghorpade, Lawrence, KS (US); Dale Allen Fritsch, Topeka, KS (US)

(73) Assignee: Hill's Pet Nutrition, Inc., Topeka, KS (US)

( * ) Notice: Subject to any disclaimer, the term of this patent is extended or adjusted under 35 U.S.C. 154(b) by 0 days.

(21) Appl. No.: 12/088,734

(22) PCT Filed: Sep. 29, 2006

(86) PCT No.: PCT/US2006/038628
§ 371 (c)(1),
(2), (4) Date: Mar. 31, 2008

(87) PCT Pub. No.: WO2007/041581
PCT Pub. Date: Apr. 12, 2007

(65) Prior Publication Data
US 2008/0254177 A1  Oct. 16, 2008

Related U.S. Application Data

(60) Provisional application No. 60/722,780, filed on Sep. 30, 2005.

(51) Int. Cl.
*A26K 1/18* (2006.01)
(52) U.S. Cl. ........ 429/302; 426/601; 426/541; 426/544; 426/545; 426/546; 426/805; 426/807; 426/106
(58) Field of Classification Search .................. 426/302, 426/601, 541, 544, 545, 546, 805, 807, 106
See application file for complete search history.

(56) References Cited

U.S. PATENT DOCUMENTS

| | | | | |
|---|---|---|---|---|
| 2,201,061 | A * | 5/1940 | Thurman | 426/330.6 |
| 2,662,664 | A * | 12/1953 | Decker | 222/23 |
| 4,216,234 | A | 8/1980 | Rawlings et al. | |
| 4,935,250 | A | 6/1990 | Cox | |
| 5,055,328 | A | 10/1991 | Evert et al. | |
| 5,431,927 | A | 7/1995 | Hand et al. | |
| 5,552,167 | A * | 9/1996 | Taylor et al. | 426/99 |
| 5,622,744 | A * | 4/1997 | Matson et al. | 426/623 |
| 5,780,039 | A * | 7/1998 | Greenberg et al. | 424/400 |
| 6,042,857 | A | 3/2000 | Jones et al. | |
| 6,063,414 | A | 5/2000 | Jones et al. | |
| 6,358,546 | B1 | 3/2002 | Bebiak et al. | |
| 6,493,641 | B1 * | 12/2002 | Singh et al. | 702/32 |
| 6,669,975 | B1 * | 12/2003 | Abene et al. | 426/302 |
| 2004/0248763 | A1 | 12/2004 | Freeman et al. | |
| 2005/0043405 | A1 | 2/2005 | Fritsch et al. | |

FOREIGN PATENT DOCUMENTS

| | | |
|---|---|---|
| RU | 2253328 C2 | 6/2005 |
| WO | WO 01/060166 | 8/2001 |
| WO | WO 2004/075653 | 9/2004 |

OTHER PUBLICATIONS

Lytle, Julia S., et al., "Stability of a Commercially Prepared Fish Oil (Omega-3 Fatty Acid) Laboratory Rodent Diet" (1992) Nutr Cancer 17:187-194.

* cited by examiner

*Primary Examiner* — C. Sayala
(74) *Attorney, Agent, or Firm* — Shannon McGarrah

(57) ABSTRACT

A process for preparing a food composition by mixing a nutritive base with at least one long chain polyunsaturated fatty acid; cooking the resulting mixture at a temperature not less than about 50° C.; adding to the food composition at least one oxidatively protected long chain polyunsaturated fatty acid; and packaging the resulting composition in an oxygen depleted environment within a sealed container to provide the food product that exhibits (1) acceptable palatability to an animal and (2) a shelf-life of at least about 6 months when stored at ambient temperature without opening the container.

30 Claims, No Drawings

METHODS FOR EXTENDING THE SHELF-LIFE OF FOOD COMPOSITIONS CONTAINING POLYUNSATURATED FATTY ACIDS

CROSS-REFERENCE TO RELATED APPLICATIONS

This application claims priority to U.S. Provisional Application Ser. No. 60/722,780 filed Sep. 30, 2005, the disclosure of which is incorporated herein by reference.

BACKGROUND OF THE INVENTION

1. Field of the Invention

This invention relates generally to methods for extending the shelf-life of food compositions and particularly to methods for extending the shelf-life of food compositions containing one or more long chain polyunsaturated fatty acids.

2. Description of the Related Art

Certain long chain polyunsaturated fatty acids (LCPUFAs) are critical nutrients for the health of an animal. LCPUFAs are increasingly known for their health benefits when included as part of an animal's diet. Since these essential nutrients cannot be synthesized from basic substrates in the body of most animal species, at least in quantities sufficient to elicit the full benefit of these nutrients, LCPUFAs or precursor LCPUFAs must be present in the animal's diet. Generally, LCPUFAs are present at low levels in the diet of many animals, including most human diets, but are completely absent from many foods.

Omega-3 fatty acids such as eicosapentaenoic acid (EPA) and docosahexaenoic acid (DHA) are particularly important LCPUFAs in animal nutrition. As important structural components of the central nervous system, they are critical dietary components for pregnant animals and newborns. Such LCPUFAS are thought to enhance cognitive function, particularly if consumed at an early age. Further, both EPA and DHA have reportedly been found to increase long bone density, decrease cancer risk, decrease inflammation, and increase visual acuity and retinal function in human infants. Both may also have a role in counteracting asthma and allergies and in alleviating psoriasis and arthritis. Cardiovascular benefits of consuming EPA and DHA have also been documented, including an improvement in heart rate variability in coronary patients, a decrease in blood levels of LDL (low density lipoprotein) in long term studies, and a reduction in sudden cardiac death in patients with coronary heart disease.

Marine oils have particularly high levels of EPA and DHA. High concentrations of these omega-3 fatty acids are found in oily species of fish native to cold waters, including salmon, mackerel, menhaden, sardine, halibut, cod, trout, tuna, eel, herring, and other species. Other sources of EPA and DHA include oils from seals, dolphins, whales, polar bears, plankton, krill, algae, and microbial sources.

Because of their beneficial properties, it is desirable to incorporate LCPUFAs and more specifically EPA and DHA into food compositions. However, these fatty acids are subject to rapid oxidation when exposed to air, metal, light, and/or heat during processing and storage of such compositions. Oxidation of LCPUFAs reduces the nutritional quality and palatability of a food composition and increases production costs. Further, compositions containing oxidation products of LCPUFAs can adversely affect the health and immune status of an animal when consumed.

Flaxseed and flaxseed oil are popular sources of LCPUFAs and tend to be somewhat more stable to oxidation than other sources of LCPUFAs. Flaxseed and flaxseed oil, however, are not direct sources of EPA and DHA. Flaxseed and flaxseed oil contains precursor LCPUFAs that must be metabolized in the body to produce the EPA and DHA.

U.S. Pat. No. 6,063,414 discloses a dry food high in soluble fiber that has increased palatability when packaged in gas impermeable bags versus lined or unlined paper bags. The food is said to contain flaxseed meal and to be "several times higher than most pet foods in unsaturated fatty acids which are susceptible to oxidation." Also reported are studies of water activity, but not palatability, of the food when the atmosphere inside the bags was modified, e.g., by nitrogen flushing to reduce oxygen below 2% and/or by addition of an oxygen scavenger.

Lytle et al. (1992) Nutrition and Cancer 17(2), 187-194 discloses low temperature (<40° C.) preparation of rodent diet formulations in the form of powder or pellets containing 16% fish oil. The formulations were reportedly packaged into bags which were flushed with nitrogen and heat sealed. The fatty acid analyses of air dried pellets, vacuum dried pellets, dried powdered diet, pellets exposed to four days of air at ambient temperatures, and pellets stored for 45 days at −20° C. showed no statistical difference in overall fatty acid composition.

Analytical data from short-term studies are not necessarily indicative of longer-term shelf-life of a food composition comprising one or more LCPUFAs. Therefore, a need still exists for processes of stabilizing food compositions containing LCPUFAs, particularly food compositions containing EPA and/or DHA, such that a desired shelf-life of at least about 6 months can be attained.

SUMMARY OF THE INVENTION

The present invention provides a process for preparing a food product wherein:
(a) a nutritive base is admixed with a zero to first amount of at least one LCPUFA;
(b) the resulting admixture is cooked at a temperature not less than about 50° C. to produce a food composition;
(c) to the food composition is added a zero to second amount of at least one oxidatively protected LCPUFA; and
(d) the resulting composition is packaged in an oxygen depleted environment within a sealed container to provide the food product;
wherein the first and second amounts of LCPUFA, either but not both of which can be zero, specified in steps (a) and (c) provide in total a bioeffective amount of LCPUFA(s); wherein the composition as packaged exhibits acceptable palatability to an animal offered the composition for consumption; and wherein the food product exhibits a shelf-life of at least about 6 months when stored at ambient temperature without opening the container, this shelf-life being determined at least by (i) substantial retention of the bioeffective amount of the at least one LCPUFA and (ii) substantial retention of the palatability of the composition upon removal from the container.

The present invention further provides a food product prepared by the above process. The invention also provides a dry food product comprising a sealed container containing, in an oxygen depleted environment within the container, a composition that comprises a nutritive base and a bioeffective amount of at least one LCPUFA, this composition exhibiting acceptable palatability to an animal offered the composition for consumption; wherein the food product exhibits a shelf-life of at least about 6 months when stored at ambient temperature without opening the container, this shelf-life being determined at least by (i) substantial retention of the bioeffective amount of the at least one LCPUFA and (ii) substantial retention of the palatability of the composition upon removal from the container.

Additional objects, features, and advantages of the invention will be apparent to those skilled in the art. Similarly further areas of applicability of the invention will be apparent from the detailed description provided hereinafter.

DETAILED DESCRIPTION OF THE INVENTION

The term "long chain polyunsaturated fatty acid" or "LCPUFA" means a fatty acid, typically existing as part of a triglyceride, wherein the fatty acid has a carbon chain length of at least 18, most commonly 18 to 22, carbon atoms and a minimum of 2 olefinic double bonds in the carbon chain.

LCPUFAs include omega-6 and omega-3 fatty acids. In an omega-6 fatty acid, the first double bond occurs between carbon atoms 6 and 7 as counted from the methyl end of the carbon chain. Examples of omega-6 fatty acids include linoleic acid (18:2n-6), γ-linolenic acid, sometimes called GLA (18:3n-6) and arachidonic acid (20:4n-6). In an omega-3 fatty acid the first double bond occurs between carbon atoms 3 and 4 as counted from the methyl end of the carbon chain. Examples of omega-3 fatty acids include α-linolenic acid or ALA (18:3n-3), eicosapentaenoic acid or EPA (20:5n-3) and docosahexaenoic acid or DHA (22:6n-3).

In step (a) of the process as summarized above, a nutritive base is admixed with a zero to first amount of at least one LCPUFA.

The term "nutritive base" means a composition comprising one or more food ingredients and capable of supplying at least a portion of an animal's daily requirement of protein and of energy sources such as carbohydrates and lipids. Optionally, but typically, the nutritive base is also capable of supplying at least a portion of the animal's daily requirement of essential amino acids, vitamins and minerals. In one embodiment, the nutritive base comprises a starch/protein/fat complex. In another embodiment, the nutritive base is suitable for preparing a treat. In yet another embodiment, the nutritive base supplies substantially all of the animal's daily requirement of protein and energy.

Any food can benefit from inclusion of at least one LCPUFA. In one embodiment, the invention provides a composition wherein the nutritive base comprises a major (at least about 25%, for example at least about 50%, by weight) component derived from animal (e.g., mammal, bird, fish or seafood) proteinaceous tissues including muscle tissues and/or offal, optionally with a carbohydrate source such as cereal grains.

At least one LCPUFA is admixed with the nutritive base in step (a). The at least one LCPUFA can be in crude, semi-purified, purified or synthetic form, in a form of a natural oil rich in the at least one LCPUFA, or a food ingredient containing such an oil. Generally the at least one LCPUFA is present as a triglyceride component but, if desired, at least a portion can be present as free acid. Oils rich in LCPUFAs and food ingredients containing such oils are well known to those of skill in the art and are further described herein.

Admixing the LCPUFA (or an oil or food ingredient containing it) with the nutritive base can be by any process known in the art and the resulting admixture can be very coarse to very fine. For example, a coarse admixture can have discrete pockets of an LCPUFA-containing oil or food ingredient within a matrix formed by the nutritive base. A fine admixture can have the at least one LCPUFA more or less homogeneously distributed throughout such a matrix.

Commonly, but without limitation of the present invention, food compositions are prepared by an extrusion process wherein, following initial mixing or compounding of food ingredients to provide a dry mix, hydration and cooking takes place in a device herein referred to as a preconditioning cylinder or "preconditioner" from which a hydrated and at least partly cooked admixture is delivered to an extruder. The preconditioner and extruder can be parts of a single apparatus. In one embodiment, the at least one LCPUFA is incorporated within a matrix formed by a starch/protein/fat complex in the nutritive base; this incorporation can occur in a preconditioner, for example, by injection of a composition such as an oil containing the at least one LCPUFA into the preconditioner. During the extrusion cooking of cereal grains and protein blends, the moistened granular floury materials are converted into dough. The starchy components gelatinize, resulting in a substantial uptake of moisture and increase in dough viscosity. Protein components impact elasticity, characteristic of hydrated and developed glutinous dough. The fats are incorporated into this matrix. At low moistures (<20%), and high temperatures it is quite likely that lipid/amylase and lipid/protein complexes will be formed. LCPUFA is part of this matrix as shown by chemical analysis of the matrix for LCPUFA.

The term "admixing a nutritive base with . . . at least one LCPUFA" does not limit the order in which particular ingredients are added. It is not necessary, for example, that all ingredients of the nutritive base are first mixed and the at least one LCPUFA is added thereafter. Some ingredients of the nutritive base can, if desired, be added after the at least one LCPUFA. The at least one LCPUFA can be added in one or more substeps within step (a) as outlined above, for example as components of one or more oils or food ingredients. Illustratively, in a composition prepared by extrusion, one portion of the at least one LCPUFA can be added to the preconditioner and a further portion to the extruder.

As noted above, in step (a) a "zero to first amount" of at least one LCPUFA is used. In one embodiment, substantially no LCPUFA is added at this stage of the process. In another embodiment, a "first amount" of at least one LCPUFA, together with a "second amount" added in step (c), provides a bioeffective amount in total of the at least one LCPUFA. In yet another embodiment, a "first amount" of at least one LCPUFA added in step (a) constitutes substantially the entire bioeffective amount of LCPUFA(s) added in the whole process. What constitutes a "bioeffective amount" of at least one LCPUFA is defined herein.

In step (b) of the process as outlined above, the admixture resulting from step (a) is cooked at a temperature not less than about 50° C. to provide a food composition.

It will be understood that steps (a) and (b) can be, but are not necessarily, performed sequentially. Steps (a) and (b) can occur simultaneously, for example in a preconditioner as described above. However, step (a) does not occur after completion of step (b); any LCPUFA added after step (b) is subject to the conditions described below for step (c). However steps (a) and (b) are performed, the at least one LCPUFA added in step (a) is subject to high temperature treatment as a component of the admixture that is cooked according to step (b).

Any cooking method known in the art that raises temperature of the admixture to not less than about 50° C. can be used, including without limitation boiling, roasting, frying, steaming, baking, grilling, etc. in any suitable cooking device. In various embodiments, the admixture is heated to a temperature not less than about 65° C., not less than about 80° C., or not less than about 95° C. A preconditioner period of approximately 2 minutes can be used. The composition is in the extruder for about 5 to 10 seconds. Preferably, the maximum temperature is about 110° C.

In one embodiment, cooking is accomplished at least in part by injection of steam, for example superheated steam, into a dry mix. This has the effect of hydrating as well as initiating cooking of the mix, and, as described above, can be done in a preconditioner.

In food compositions prepared by extrusion, cooking can continue in the extruder, which forces the composition, now a hot plastic mass, through an appropriately perforated die plate. Strands of the composition exiting the die holes can be cut into desired lengths, for example by means of a rotating knife assembly.

Where the food composition is to be packaged in moist or semi-moist form, it is now ready, optionally following cooling, to proceed to step (c). However, in one embodiment of the present process a cooked and hydrated food composition is dried to provide a dry food. The term "dry food" herein is used in the art-accepted sense of a food containing about 3% to about 11% water. A dry food prepared by extrusion and cutting of extruded strands into short lengths is known as a kibble. Drying is typically performed at elevated temperature, and further cooking can occur during this procedure.

It is believed, without being bound by theory, that presence of a thin boundary layer of water, for example a water monolayer, on the surfaces of dry food pieces such as kibbles, can restrict contact of the food composition with atmospheric oxygen. According to one embodiment, water content of the food should not be reduced so low as to prevent formation of such a boundary layer. For example, a dry food prepared according to a process embraced herein can have a water content of about 6% to about 11%, illustratively about 7% to about 10%.

In step (c) of the process as outlined above, a zero to second amount of at least one oxidatively protected LCPUFA is added to the food composition resulting from the cooking step. This addition can occur before or after drying (in the case of a dry food product), and can occur while the composition is still hot, or after cooling.

In one embodiment, substantially no LCPUFA is added at this stage of the process. In another embodiment, a "second amount" of at least one LCPUFA, together with a "first amount" added in step (a), provides a bioeffective amount in total of the at least one LCPUFA. In yet another embodiment, a "second amount" of at least one LCPUFA added in step (c) constitutes substantially the entire bioeffective amount of LCPUFA(s) added in the whole process.

LCPUFA(s) can be added in any form, as described above for step (a). However, when added in step (c), the at least one LCPUFA should be "oxidatively protected", i.e., placed in an environment that substantially limits exposure to, or ability to react with, oxygen or strong oxidizing agents such as peroxides.

Illustratively and without limitation, the at least one LCPUFA added in step (c) can be oxidatively protected by one or more of the following means:

(i) providing an interval between addition of the at least one LCPUFA in step (c) and packaging in an oxygen depleted environment as described below in step (d) that is sufficiently short to minimize or avoid oxidation;

(ii) selecting an LCPUFA source having low peroxide value (PV);

(iii) encapsulating the at least one LCPUFA (for example encapsulating a natural oil containing the at least one LCPUFA) in a capsule shell providing an oxygen barrier; and/or (iv) adding one or more antioxidants together with the at least one LCPUFA.

An interval that is "sufficiently short" to minimize or avoid oxidation can depend on various factors, including the source and free fatty acid content of the LCPUFA(s), the temperature of the food composition to which the LCPUFA(s) are added, etc., and can be determined without undue experimentation, but will typically be not longer than about 24 hours.

PV is a measure of presence of hydroperoxides, which are initiators of autoxidation of unsaturated fatty acids. PV of a source of LCPUFA(s) to be used in a process of the invention should be, according to one embodiment, not greater than about 5 meq/kg, preferably for most purposes not greater than about 2 meq/kg.

Encapsulation includes microencapsulation. Microcapsules of any suitable size, for example from about 100 to about 1,500 µm, illustratively about 500 to about 900 µm, can be used. Microcapsules can be prepared by any procedure known in the art, for example by cross-linking with glutaraldehyde. Microencapsulation enables an oil, such as marine oil, to be provided in a form of a dry powder.

Suitable antioxidants include without limitation butylated hydroxyanisole (BHA), butylated hydroxytoluene (BHT), rosemary extracts, ethoxyquin, ascorbic acid, tocopherols, tocotrienes, 6-hydroxy-2,5,7,8-tetramethylchroman-2-carboxylic acid (e.g., Trolox®), salts and esters thereof, and combinations thereof. Numerous proprietary antioxidant preparations are available containing rosemary extract, in some cases together with other antioxidant substances. Such preparations include Duralox™ and Naturox™.

When an unsaturated fatty acid loses a hydrogen atom, a free radical is formed at the site of unsaturation. The free radical is quickly converted to a fatty acid peroxide free radical and finally to a fatty acid hydroperoxide. Hydroperoxides continue to break down into aldehydes and ketones, which can cause rancidity and contribute to reduced palatability, and can have other, potentially more serious, adverse effects. This reaction can be prevented if, when the first free radical is formed, a hydrogen atom is supplied to replace the hydrogen atom originally lost from the fatty acid. Antioxidants such as those listed above serve as one way to provide the replacement hydrogen necessary to prevent peroxidation of fatty acid free radicals.

Selection of an antioxidant system can be made by one of skill in the art using any known procedure. One such procedure is known as the oil stability index (OSI) method and is an automated procedure for determining the time taken for oxidation products to develop in a heated oil. An OSI value of less than about 15 h indicates that the antioxidant system selected is probably inadequate. In one embodiment an antioxidant system is selected providing an OSI value of at least about 30 h.

Addition of at least one LCPUFA to a food composition in step (c) is generally a topical operation, i.e., involving surface-application of the added material. Where the food composition is a dry kibble, addition of the at least one LCPUFA can be combined with addition of other materials that are typically applied in a coating, for example palatants such as fats, animal extracts and flavorants.

In step (d) of the process as outlined above, the food composition is packaged in an oxygen depleted environment within a sealed container to provide the food product.

An "oxygen depleted environment" within a container is one having a substantially lower oxygen partial pressure ($pO_2$) than the ambient atmosphere (ca. 160 torr). Illustratively, $pO_2$ in the container can be less than about 80, less than about 50, less than about 30 or less than about 15 torr. Reduced $pO_2$ can be obtained by drawing a vacuum; alternatively the container or headspace (the unfilled volume of the container above the food composition) can be flushed or swept with an inert gas such as nitrogen or a noble gas to provide an oxygen depleted atmosphere. Illustratively, flushing with nitrogen can readily lower oxygen content of the atmosphere within the container to about 5% or less, for example about 2% or less.

Standard canning procedures, wherein a can is sealed while the moist contents are hot and the headspace consists essentially of water vapor, also lead to an oxygen depleted environment as the water vapor condenses on cooling, leaving a partial vacuum.

To obtain a long shelf-life as required herein, the oxygen depleted environment must be maintained during an extended period of storage, e.g., at least about 6 months, of the food product. Accordingly, the container wall should be made of a material that resists transfer of oxygen, or at least should comprise a layer or lining of such a material. Suitable materials include metal (e.g., steel or aluminum), glass and polymers of low oxygen permeability, such as high density polyethylene (HDPE), EVOH, foil film, metalized film, and laminated high density polyethylene film. It is also important that the container have an effective seal. For a dry food product, standard multi-layer packaging, for example paper bags having an HDPE layer or laminated with a metallized plastic lining, will generally be found sufficient. In one embodiment, multi-layer packaging is provided having an inner layer or liner containing an oxygen scavenger or antioxidant.

As indicated above, the first and second amounts (either but not both of which can be zero), specified in steps (a) and (c) respectively, provide in total a bioeffective amount of LCPUFA(s). A "bioeffective amount" herein is an amount that, when the composition is consumed by an animal in a daily amount consistent with good overall nutrition, enhances health or wellness of the animal.

LCPUFAs have been implicated in a wide variety of vital functions. However, a bioeffective amount of LCPUFAs depends on the particular LCPUFA, the animal species, the duration of feeding, and the particular aspect of animal health or wellness targeted. For example, an amount in the diet as low as about 0.02% on a dry matter (DM) basis can be effective in generally enhancing quality of life in aged canines if fed over a prolonged period, whereas at least about 2.5% DM may be necessary to provide a benefit in mitigating tissue damage due to radiation treatment and at least about 5% DM in inhibiting tumorigenesis in cancer patients. Between these extremes, at least about 0.05% DM can be effective in enhancing canine cognitive function, at least about 0.1% DM in reducing diarrhea, at least about 0.2% in improving joint function, at least about 0.2% in improving hunting performance in dogs, and at least about 0.5% DM in influencing behavior. A maximum amount of LCPUFAs in an animal's diet is the highest amount tolerated by the animal without adverse side effects.

Where the food composition is a treat to be used in relatively small quantities to supplement an animal's diet in one or more LCPUFA(s), higher concentrations of the at least one LCPUFA in the food composition will generally be desirable than in a composition satisfying substantially all dietary requirements of the animal on a daily basis.

In various embodiments, then, the total amount of LCPUFA(s) in a food product prepared according to the present process can be about 0.02% DM to a maximum amount, for example about 0.05% to about 50%, about 0.1% to about 20%, or about 0.2% to about 10%. Similar ranges can apply to any particular LCPUFA or combination of LCPUFAs, for example linoleic acid, EPA, DHA or a mixture of EPA and DHA.

Where the at least one LCPUFA is localized, for example in pockets in the interior of a kibble or on the surface of a kibble, local concentrations can exceed those suggested here, but the overall amount in the food as a whole will generally be in a range as indicated above.

In one embodiment the at least one LCPUFA comprises EPA, DHA or a mixture thereof. In another embodiment the at least one LCPUFA comprises linoleic acid. In yet another embodiment the at least one LCPUFA comprises linoleic acid and at least one of EPA and DHA. For example, linoleic acid, e.g., in flaxseed, can be added in step (a) and a mixture of EPA and DHA, e.g., in marine oil, can be added in step (c).

The at least one LCPUFA can be added, as indicated above, in a form of a LCPUFA-rich natural oil. Certain plant oils, more particularly oils derived from seeds, nuts, grains and legumes of certain plant species, are rich sources of LCPUFAs. Examples include flaxseed, rapeseed (including canola) and walnut oils (especially rich in ALA); corn, cottonseed, safflower, soybean and sunflower oils (especially rich in linoleic acid); and blackcurrant, borage and evening primrose oils (especially rich in GLA). A wide variety of oils obtained from marine sources, usually referred to as "marine oils", are also rich sources of LCPUFAs. Examples include fish oils, obtained from numerous species of mainly cold-water fish including salmon, mackerel, menhaden, sardine, halibut, cod, trout, tuna, eel and herring, which are especially rich in EPA and DHA. LCPUFA-rich oils can be extracted from their crude sources, but in many cases the crude sources themselves, such as ground flaxseed, can be used directly according to the present process.

As indicated above, the composition as packaged exhibits acceptable palatability to an animal offered the composition for consumption. "Palatability" herein refers to a relative preference of an animal for one food composition over another, for example as determined by a standardized testing protocol in which the animal has equal access to both compositions. Such preference can arise from any of the animal's senses, but typically is a function predominantly of taste and/or aroma. A test food prepared according to the present process and stated herein to have "acceptable palatability" is one over which an animal exhibits no strong preference for a reference food selected from commercially successful foods of the same general type, e.g., kibbles, canned foods, treats, etc., nutritionally adapted for the same animal species. No "strong preference" against the test food is shown if, in a standardized protocol, animals consume up to about 2 times the amount of the reference food that they consume of the test food (i.e., appear to prefer the reference food by a factor not greater than about 2:1).

Also as indicated above, the food product prepared by the present process should exhibit a shelf-life of at least about 6 months when stored at ambient temperature without opening the container, this shelf-life being determined at least by (i) substantial retention of the bioeffective amount of the at least one LCPUFA and (ii) substantial retention of the palatability of the composition upon removal from the container.

If substantial oxidation of the at least one LCPUFA occurs during the period of storage, bioeffectiveness can be reduced, and palatability can be adversely affected, for example by accumulation of oxidation products. Adherence to a process as defined herein can result in limitation of the oxidation process to a point where a surprisingly long shelf-life, as determined by retention of bioeffectiveness and palatability, is obtainable. In some embodiments a shelf-life of at least about 9 months, at least about 1 year, or at least about 2 years can be obtained.

Shelf-life herein is defined in the context of storage, without opening (or otherwise breaking the seal of) the container, at ambient temperature. For present purposes, "ambient temperature" means any temperature within a range commonly occurring in the interior of warehouse or retail facilities, for example about 15° C. to about 25° C. It will be understood that storage at higher temperatures can be expected to shorten shelf-life and at lower temperatures to prolong shelf-life.

Bioeffectiveness can be determined directly, by in vivo testing in an animal species for which the composition is nutritionally and/or organoleptically adapted, or in laboratory animals providing an adequate nutritional and metabolic model for that species; alternatively, testing of bioeffectiveness can be conducted using a model system, for example an invertebrate model, a non-animal model, a cell culture model or an ex vivo model using tissue explants. In one embodiment, bioeffectiveness is determined indirectly from chemical analysis of the food composition after a period of storage, wherein the total LCPUFA content, or the content of one or more individual specific LCPUFAs, is measured. Various indicators of LCPUFA content, including polyene index (a measure of LCPUFA content that uses the saturated $C_{16}$ fatty acid hexadecanoic acid as a reference) are available to those of skill in the art.

Optionally, shelf-life can be defined to require additional criteria, for example an acceptably low level of oxidation products of the at least one LCPUFA.

An illustrative process for preparing a moist food product is as follows. Ground animal (e.g., mammal, poultry, fish and/or seafood) proteinaceous tissues are mixed with other ingredients, including for example, animal fats and vegetable oils, cereal grains, other nutritionally balancing ingredients, and special purpose additives (e.g., vitamin and mineral mixtures, inorganic salts, cellulose and beet pulp, bulking agents, and the like). Among these ingredients are one or more sources of at least one LCPUFA. Water sufficient for processing is also added. The ingredients typically are mixed in a vessel suitable for heating while blending the components. Heating of the mixture can be effected in any suitable manner, such as, for example, by direct steam injection or by using a vessel fitted with a heat exchanger. Following addition of the last of the ingredients, the mixture is heated in a pre-cooking step to a temperature of up to about 100° C. Higher temperatures can be acceptable, but can be commercially impractical without use of other processing aids. When heated to an appropriate temperature, the material is typically in the form of a thick liquid. The thick liquid is filled into suitable containers such as cans, jars, pouches, tubes, or the like. An oxygen depleted environment within each container is provided, for example by applying a vacuum, or by flushing the container with an inert gas, and the container is hermetically sealed. The sealed container is then placed into conventional equipment designed to sterilize the contents. This is usually accomplished by heating to a temperature of at least about 110° C. for an appropriate time, which is dependent on, for example, the temperature used and the particular composition. Products can also be prepared by an aseptic process wherein the contents are heated to commercial sterility before being packaged in an oxygen depleted environment in sterilized containers.

An illustrative process for preparing a moist food product is as follows. Dry ingredients including, for example, animal protein sources, plant protein sources, grains, etc., are ground and mixed together to provide a dry mix. Moist or liquid ingredients, including fats, oils, animal protein sources, minerals, water, etc., are then added to and mixed with the dry mix. Among these ingredients can be one or more sources of at least one LCPUFA. The dry mix is hydrated in a preconditioner by injection of steam, which initiates cooking of the composition. The hydrated composition is fed to an extruder, where the cooked or semi-cooked mixture is extruded and cut off into kibble by a rotating knife. The kibble is then dried and optionally coated with one or more topical coatings which can contain, for example, flavors, fats, oils, powders, and the like, and can include a source of at least one LCPUFA. The kibble is finally packaged in a container under an oxygen depleted environment, for example by flushing with an inert gas such as nitrogen, and hermetically sealed.

A dry food can alternatively be made from an LCPUFA-containing dough using a baking process. The dough can be placed in a mold before dry-heat processing to provide pieces, such as dog or cat treats, of particular shape. These are packaged under an oxygen depleted environment as described above.

The process as described herein can be useful in preparing a food product comprising a composition that is nutritionally and/or organoleptically adapted for feeding to a human or non-human animal. In various embodiments, the composition is adapted for feeding to a vertebrate, for example, a fish, a bird, a reptile, or a mammal. Illustratively, among mammals, the animal can be a member of the order Carnivora, including without limitation canine and feline species. The composition can be nutritionally and/or organoleptically adapted for feeding to a variety of animal species, including non-human animals such as non-human primates (e.g., monkeys, chimpanzees, etc.), companion animals (e.g., dogs, cats, horses, etc.), farm animals (e.g., goats, sheep, pigs, cattle, etc.), laboratory animals (e.g., mice, rats, etc.), birds (e.g., domestic birds such as canaries, parrots, etc. and commercial birds such as chickens, ducks, geese, turkeys, etc.), rodents (e.g., hamsters, guinea pigs, gerbils, rabbits, hedgehogs, ferrets, chinchillas, etc.) and wild, exotic and zoo animals (e.g., wolves, bears, deer, etc.).

In some embodiments, the food composition is nutritionally and/or organoleptically adapted for feeding to a companion animal. A "companion animal" herein is an individual animal of any species kept by a human caregiver as a pet, or any individual animal of a variety of species that have been widely domesticated as pets, including dogs (*Canis familiaris*) and cats (*Felis domesticus*), whether or not the individual animal is kept solely or partly for companionship. Thus, "companion animals" herein include working dogs, farm cats kept for rodent control, etc., as well as pet dogs and cats.

Another embodiment of the invention is a dry food product comprising a sealed container containing, in an oxygen depleted environment within the container, a composition that comprises a nutritive base and a bioeffective amount of at least one LCPUFA, this composition exhibiting acceptable palatability to an animal offered the composition for consumption; wherein the food product exhibits a shelf-life of at least about 6 months when stored at ambient temperature without opening the container, this shelf-life being determined at least by (i) substantial retention of the bioeffective amount of the at least one LCPUFA and (ii) substantial retention of the palatability of the composition upon removal from the container.

Such a dry food product can be prepared by a process as described above and can be modified by any of the optional variations set forth for the process, to the extent they are appropriate to a dry product.

Optionally, the product further comprises a means for communicating information about or instructions for feeding the composition to an animal. Such a communicating means can comprise, for example, a document such as a label, brochure, advertisement or package insert, a computer-readable digital or optical medium such as a diskette or CD, an audio presentation, for example on an audiotape or CD, a visual presentation, for example on a videotape or DVD, or a combination thereof, and can refer to additional information elsewhere, for example in one or more pages on a website.

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise, e.g., reference to "a method" includes a plurality of such methods. Similarly, the words "comprise", "comprises", and "comprising" are to be interpreted inclusively rather than exclusively.

Unless defined otherwise, all technical and scientific terms and any acronyms used herein have the same meanings as commonly understood by one of ordinary skill in the art in the field of the invention. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, and other references cited or referred to herein are incorporated herein by reference to the extent allowed by law. The discussion of those references is intended merely to summarize the assertions made therein. No admission is made that any such patents, patent applications, publications or references, or any portion thereof, is relevant prior art for the present invention and the right to challenge the accuracy and pertinence of such patents, patent applications, publications, and other references is specifically reserved.

EXAMPLES

This invention can be further illustrated by the following examples of preferred embodiments, although it will be understood that these examples are included merely for purposes of illustration and are not intended to limit the scope of the invention unless otherwise specifically indicated.

Example 1

A nutritionally balanced formula for dogs was prepared by an extrusion process as follows. A dry mix containing 52% corn meal, 13% poultry meal, 9% rice, 9% soybean mill run, 9% peanut hulls, 4% flaxseed, 2% corn gluten meal, 1% dried egg, and 2% minerals, vitamins and other nutrients was prepared using standard batching techniques in which the ingredients were metered at the proper concentrations, batch mixed, milled through a standard $4/64^{th}$ inch screen and delivered to an Acrison loss-in-weight feeder. The feeder delivered the dry mix at a desired rate into a DDC-7 preconditioning cylinder, where the dry mix was preconditioned prior to the extrusion process by addition of water and steam to raise the temperature of the dry mix. This initiated hydration and cooking of starch components within the dry mix.

The preconditioned dry mix was then transferred into a Wenger X-135 extruder and further cooked the dry mix using steam, water, and friction to achieve desired characteristics of density, moisture, and plasticity. The resulting bioplastic melt was then forced through a die plate equipped with die holes of desired size and shape. As the cooked and formed extrudate exited the dies, it expanded and was cut into a desired length of kibble using a rotating knife assembly.

The kibble was then transferred into a multi-stage horizontal belt dryer and dried to a desired moisture level, usually less than 11% moisture by weight. After drying, the kibble was screened to remove fines. Then, the screened kibble was coated with a topical mixture of additional liquid and dry ingredients in a continuous double mixing screw conveyor. The topical mixture included 35% flax oil, 26% animal digest, 10% animal fat, and natural flavor, to which 29% marine oil was added in a tank equipped with an overhead variable speed mixer. The marine oil (2.25%) contained 18% EPA and 12% DHA by weight, and was stabilized with antioxidant. The topical mixture was metered at the required rate as a single stream into the coating device and uniformly applied to the kibble. The coated kibbles were transferred into a cooler and then packaged in hermetically sealed nitrogen flushed bags with low levels of residual oxygen to provide a finished dog food product. The marine oil was stabilized with antioxidant. The product was packaged within 1 hour.

Numerous batches of the food product were produced in the above manner. Samples of the finished composition were analyzed to measure initial EPA and DHA content as shown in Table 1.

TABLE 1

Initial EPA and DHA Content of Food

| Batch | % DM | |
|---|---|---|
| | EPA | DHA |
| 1 | 0.37 | 0.31 |
| 2 | 0.34 | 0.29 |
| 3 | 0.41 | 0.33 |
| 4 | 0.50 | 0.34 |
| 5 | 0.36 | 0.24 |
| 6 | 0.41 | 0.27 |
| 7 | 0.40 | 0.25 |

Example 2

The dog food product prepared according to Example 1 was tested for palatability in a two pan feeding protocol to confirm animal acceptance. Palatability was determined in comparison with four commercial dog food products over two days with 20 dogs. The tests were conducted over two days by providing simultaneous access to equal amounts (approximately 500 g per dog) of each of the test composition and one commercial dog food composition. After 45 minutes, the compositions were collected and weighed to determine how much of each composition was consumed. No evidence of intolerance to the compositions was observed in the dogs following intake. Results are shown in Table 2. The data indicate that the dogs generally preferred the test composition over the commercialized dog food.

TABLE 2

Results of Palatability Studies
Average amount per dog of each composition consumed

| Test 1 | Test composition | 225 g | Purina Dog Chow | 81 g |
|---|---|---|---|---|
| Test 2 | Test composition | 250 g | Pedigree Mealtime | 156 g |
| Test 3 | Test composition | 176 g | Iams Chunks | 109 g |
| Test 4 | Test composition | 217 g | Science Diet Canine Senior | 59 g |

Example 3

The dog food product prepared according to Example 1 was analyzed to measure loss of EPA as a measure of stability. The food was stored in the hermetically sealed nitrogen flushed bags at 72° F. and 65% relative humidity. The results, shown in Table 3, indicate no decrease in the content of EPA in the food over a period greater than one year.

TABLE 3

Storage Stability of Food as Measured by EPA Content

| Days after preparation | EPA (% DM) |
|---|---|
| 0 | 0.39 |
| 14 | 0.36 |
| 28 | 0.35 |
| 56 | 0.37 |
| 84 | 0.38 |
| 112 | 0.36 |
| 140 | 0.37 |
| 168 | 0.39 |
| 196 | 0.35 |
| 224 | 0.38 |
| 252 | 0.33 |
| 280 | 0.36 |
| 308 | 0.39 |
| 336 | 0.34 |
| 364 | 0.34 |
| 392 | 0.36 |

Example 4

A nutritionally balanced formula for dogs was prepared by the process described for Example 1, except that the marine oil was stabilized and was combined with the dry mix by being injected into the preconditioning cylinder instead of being added in the topical coating mixture. The marine oil was stabilized with 10,000 ppm of a commercial antioxidant.

Testing showed that injection of the marine oil into the preconditioner prior to the extrusion process protected the material from oxidation. This protection occurred by incorporating the oil within the matrix of a starch/protein/fat complex during preconditioning of the food composition. The marine oil was stabilized with antioxidant.

Example 5

A dog food was prepared containing 4% salmon oil in the coating to which was added 5000 ppm of a commercial antioxidant. The food was prepared by a process similar to that of Example 4 and was packaged in a multi-wall paper bag laminated with a plastic liner to provide a finished dog food product.

The product was stored under accelerated storage conditions of 106° F. and 65% relative humidity (believed to project one month of shelf-life for each week under the accelerated storage conditions). Stability of the food was measured by peroxide value (PV) (an indicator of oxidation determined by the level of hydroperoxides) and polyene index (the ratio of the sum of EPA and DHA to n-hexadecanoic acid). Criteria for end of shelf-life were PV >50 meq/kg oil or 20% reduction in polyene index. As shown in Table 4, during 20 weeks of accelerated storage, PV increased from 6.7 to 19 meq/kg oil, but remained well under the maximum of 50 meq/kg oil. Polyene index decreased slightly over 14 weeks from 0.42 to 0.40, which represents an approximately 5% reduction of EPA and DHA. The results indicate that this formula would be stable under ambient conditions for longer than 12 months.

TABLE 4

Peroxide Value and Polyene Index of Dog Food under Accelerated Storage

| Storage time (weeks) | PV (meq/kg oil) | Polyene index | Polyene % reduction |
|---|---|---|---|
| 0 | 6.7 | 0.4213 | |
| 3 | 6.4 | ND | ND |
| 6 | 15.0 | 0.3918 | 7.0 |
| 9 | 10.0 | 0.3918 | 7.0 |
| 12 | 15.0 | 0.4034 | 4.2 |
| 14 | 16.0 | 0.4000 | 5.1 |
| 15 | 16.0 | ND | ND |
| 16 | 17.0 | ND | ND |
| 18 | 19.3 | ND | ND |
| 20 | 19.0 | ND | ND |

ND = not determined

Example 6

Dog foods were prepared by a process similar to that of Examples 1 and 4, containing 7% salmon oil to which was added 5000 ppm commercial antioxidant preparation. The salmon oil was added as a coating on the exterior of the kibble or incorporated into food during extrusion. In one method, the oil was put on as a coating. In another the oil was put on as a coating but injected during precondidtioning. The product was packaged using the method of Example 5.

PV of both foods increased during the first 6 weeks of accelerated storage, then decreased and stabilized. It is believed that the initial rise in PV reflected stress resulting from processing. All PVs remained below the maximum criteria of 50 meq/kg oil up to 16 weeks after preparation. Polyene index of the food with salmon oil coated on the exterior showed inconsistent results, but demonstrated no strong trend of degradation throughout the accelerated storage period. Results are shown in Table 5. The data suggested that both foods would be stable for at least 12 months under ambient storage conditions.

TABLE 5

Peroxide Value and Polyene Index of Foods under Accelerated Storage

| | PV (meq/kg oil) | | Polyene index | | | |
|---|---|---|---|---|---|---|
| Storage time (weeks) | Salmon oil on exterior | Salmon oil in interior | Salmon oil on exterior | % reduction | Salmon oil in interior | % reduction |
| 0 | 10.4 | 16.6 | 0.63 | | 0.68 | |
| 3 | 23.7 | 28.9 | 0.40 | 38 | 0.67 | 1 |
| 6 | 21.6 | 22.3 | 0.57 | 11 | 0.66 | 2 |
| 9 | 15.8 | 9.5 | 0.53 | 17 | 0.65 | 4 |
| 12 | 2.0 | 2.0 | ND | ND | ND | ND |
| 14 | 19.0 | 2.0 | 0.55 | 14 | 0.65 | 4 |
| 15 | 17.9 | 4.4 | 0.55 | 14 | 0.63 | 8 |
| 16 | 2.0 | 2.0 | 0.62 | 2 | 0.65 | 4 |

ND = not determined

Example 7

A nutritionally balanced pet food was prepared by preparing a dry mix of 40-49% corn meal, 12% poultry meal, 8-11% rice, 8-11% soybean mill run, 6-8% peanut hulls, 4% flaxseed, 1-2% dried egg, 1-2% corn gluten meal, and 2% minerals, vitamins and other nutrients. After mixing and grinding to reduce size, 0 to 10% by weight dry microencapsulated marine oil containing 25% to 60% omega-3 fatty acids was added. This mixture was then extruded and dried substantially as described in Example 1. The resulting kibble was coated with 3% flaxseed oil, 2% animal digest and 1% animal fat. The product was packaged using the method of Example 5.

Example 8

A nutritionally balanced dog food was prepared as described for Example 7, except that the dry encapsulated marine oil was added in the coating rather than to the dry mix.

Example 9

A nutritionally balanced dog food was prepared as described for Example 7, except for addition of the dry encapsulated marine oil to the dry mix, after mixing and grinding to reduce size. The mixture was extruded substantially as described in Example 1. During extrusion, 0 to 5% marine oil was added. This example shows encapsulated marine oil being added at one step in the process: post grinding of the ingredients for extrusion. It also shows fish oil being added at two additional steps: during preconditioning, and during coating. After extrusion and drying, the resulting kibbles were individually coated with 0 to 10% marine oil, 3% flaxseed oil, 2% animal digest and 1% animal fat.

Example 10

A nutritionally balanced dog food was prepared as described for Example 7, except as indicated below. After mixing and grinding to reduce size, 0 to 10% dry microencapsulated marine oil containing 10% to 70% omega-3 fatty acid was added. In the preconditioner, 0 to 5% liquid marine oil was added. After extrusion and drying, the resulting kibble was coated with 0 to 10% marine oil, 3% flaxseed oil, 2% animal digest and 1% animal fat.

In the specification, there have been disclosed typical preferred embodiments of the invention and, although specific terms are employed, they are used in a generic and descriptive sense only and not for purposes of limitation, the scope of the invention being set forth in the claims. Obviously many modifications and variations of the invention are possible in light of the above teachings. It is therefore to be understood that within the scope of the appended claims the invention may be practiced otherwise than as specifically described.

What is claimed is
1. A process for preparing a food product comprising: (a) admixing a nutritive base with a first amount of at least one long chain polyunsaturated fatty acid; (b) cooking the resulting admixture at a temperature not less than about 50° C. to produce a food composition; (c) adding to the food composition a second amount of at least one oxidatively protected long chain polyunsaturated fatty acid; and (d) packaging the resulting composition in a container having an oxygen depleted environment to provide the food product; wherein the first and second amounts of long chain polyunsaturated fatty acid(s) specified in steps (a) and (c) provide in total a bioeffective amount of long chain polyunsaturated fatty acid(s); and wherein step (c) is performed after steps (a) and (b) are completed and step (d) is performed after step (c) is completed.

2. The process of claim 1 wherein the shelf-life is at least about 6 months.

3. The process of claim 1 wherein the first amount is a total long chain polyunsaturated fatty acid amount of about 0.1% to about 10% by weight of the composition on a dry matter basis.

4. The process of claim 1 wherein the first amount is a total long chain polyunsaturated fatty acid amount of about 0.2% to about 5% by weight of the composition on a dry matter basis.

5. The process of claim 1 wherein the second amount is a total long chain polyunsaturated fatty acid amount of about 0.1% to about 10% by weight of the composition on a dry matter basis.

6. The process of claim 1 wherein the second amount is a total long chain polyunsaturated fatty acid amount of about 0.2% to about 5% by weight of the composition on a dry matter basis.

7. The process of claim 1 wherein the food composition is nutritionally and/or organoleptically adapted for feeding to an animal of the order Carnivora.

8. The process of claim 1 wherein the cooked food composition is nutritionally and/or organoleptically adapted for feeding to a canine or feline.

9. The process of claim 1 wherein the cooked food composition is a dry animal food.

10. The process of claim 9 wherein the food is in a form of kibbles.

11. The process of claim 10 wherein the second amount of at least one oxidatively protected long chain polyunsaturated fatty acid is added in a coating applied to the kibbles.

12. The process of claim 1 wherein the first amount of at least one long chain polyunsaturated fatty acid is added to the nutritive base by incorporation of at least a portion of the first amount within a matrix of a starch/protein/fat complex.

13. The process of claim 12 wherein the incorporation is achieved by injection of at least a portion of the at least one long chain polyunsaturated fatty acid into a preconditioner.

14. The process of claim 1, wherein oxidative protection is achieved at least in part by encapsulation of the second amount of at least one long chain polyunsaturated fatty acid.

15. The process of claim 1 wherein oxidative protection is achieved at least in part by adding at least one antioxidant together with the second amount of at least one long chain polyunsaturated fatty acid.

16. The process of claim 15 wherein the at least one antioxidant is selected from the group consisting of butylated hydroxyanisole, butylated hydroxytoluene, rosemary extracts, ethoxyquin, ascorbic acid, tocopherols, tocotrienes, 6-hydroxy-2,5,7,8-tetramethylchroman-2-carboxylic acid, salts and esters thereof, and combinations thereof.

17. The process of claim 1 wherein the first and/or second amount of at least one long chain polyunsaturated fatty acid is added in a form comprising at least one marine oil.

18. The process of claim 17 wherein the marine oil comprises a fish oil.

19. The process of claim 18 wherein the fish oil is derived from a fish selected from the group consisting of salmon, mackerel, menhaden, sardine, halibut, cod, trout, tuna, eel, herring and combinations thereof.

20. The process of claim 1 wherein the at least one long chain polyunsaturated fatty acid in the first and/or second amount is an omega-3 fatty acid.

21. The process of claim 20 wherein the omega-3 fatty acid is selected from eicosapentaenoic acid, docosahexaenoic acid and mixtures thereof.

22. The process of claim 1 wherein the at least one long chain polyunsaturated fatty acid in the first and/or second amount is linoleic acid.

23. The process of claim 22 wherein the linoleic acid is added in a form comprising a plant oil.

24. The process of claim 23 wherein the plant oil comprises flaxseed oil.

25. The process of claim 1 wherein the oxygen depleted environment is achieved by vacuum sealing the container.

26. The process of claim 1 wherein the oxygen depleted environment comprises an oxygen depleted atmosphere over the cooked food composition within the container.

27. The process of claim 26 wherein the oxygen depleted atmosphere is obtained by flushing the container with an inert gas prior to sealing.

28. The process of claim 27 wherein the inert gas is nitrogen.

29. The process of claim 1 wherein the container is a multilayer package.

30. The process of claim 29, wherein the multilayer package comprises an inner layer having at least one antioxidant therein or thereon.

* * * * *